US00RE34243E

United States Patent [19]

Gerber

[11] E Patent Number: Re. 34,243

[45] Reissued Date of Patent: May 4, 1993

[54] VALVE ASSEMBLY

[75] Inventor: Bernard R. Gerber, Santa Cruz, Calif.

[73] Assignee: ReSeal International Limited Partnership, New York, N.Y.

[21] Appl. No.: 728,537

[22] Filed: Jul. 11, 1991

Related U.S. Patent Documents

Reissue of:

[64] Patent No.: 4,846,810
Issued: Jul. 11, 1989
Appl. No.: 72,534
Filed: Jul. 13, 1987

[51] Int. Cl.[5] ..... A61M 5/00

[52] U.S. Cl. ..... 604/247; 137/853; 222/494

[58] Field of Search ..... 604/247, 213, 9, 10; 222/490, 494; 137/853, 860

[56] References Cited

U.S. PATENT DOCUMENTS

| | | | |
|---|---|---|---|
| 2,141,507 | 12/1938 | Bourdon | 137/853 |
| 2,715,980 | 8/1955 | Frick | 137/853 |
| 2,988,103 | 6/1961 | Canvasser | 137/853 |
| 3,506,163 | 4/1970 | Rauh et al. | 222/494 |
| 3,739,952 | 6/1973 | Chafitz et al. | 222/494 |
| 3,902,664 | 9/1975 | Deines | 222/494 |
| 3,991,768 | 11/1976 | Portnoy | 604/10 |
| 4,346,704 | 8/1982 | Kulle | 604/247 |
| 4,568,333 | 2/1986 | Sawyer et al. | 137/860 |
| 4,657,530 | 4/1987 | Buchwald et al. | 604/247 |
| 4,657,536 | 4/1987 | Dorman | 604/9 |

*Primary Examiner*—John D. Yasko
*Attorney, Agent, or Firm*—Anderson Kill Olick & Oshinsky

[57] ABSTRACT

A valve assembly includes an elongated valve body, an elastomeric sheath laterally enclosing the outside surface of the valve body with the sheath being sealed to the valve body at its ends spaced apart in the elongated direction. An inlet channel extends in the elongated direction from one end of the valve body for receiving a fluid from a container, such as a flexible container. An outlet channel is located at the opposite end of the valve body extending in the elongated direction for discharging the fluid received in the inlet channel. At least one port extends outwardly from the inlet channel to the outside surface of the valve body so that the fluid can flow between the outside surface and the elastomeric sheath causing the sheath to expand. The fluid between the outside surface of the valve body and the sheath flows to at least one other port in the valve body directed inwardly to the outlet channel so that the fluid can be discharged. The sheath prevents back flow from the outlet channel into the container.

24 Claims, 3 Drawing Sheets

VALVE ASSEMBLY

Matter enclosed in heavy brackets [ ] appears in the original patent but forms no part of this reissue specification; matter printed in italics indicates the additions made by reissue.

*This application is a reissue of Ser. No. 072,534 filed Jul. 13, 1987 now U.S. Pat. No. 4,846,810.*

BACKGROUND OF THE INVENTION

The present invention is directed to a valve assembly for use in discharging a fluid from a container, such as a flexible container, and for preventing any flow of contaminants through the valve assembly into the container. The valve assembly includes an elongated valve body with an elastomeric sheath laterally enclosing the outside surface of the valve body. Flow passes through the valve body into the space between the outside surface of the valve body and the elastomeric sheath. Subsequently, the flow returns inwardly through the valve body and out through an outlet or discharge channel.

In dispensing sterile fluids from a container where the container has an extended period of use-life, it is important to prevent any back flow of contamination into the container during and after the dispensing operation has been carried out. Contamination in the form of materials originating from outside of the valve assembly and container may include microorganisms, atmospheric gases, moisture, dust and the like. If the sterile fluid is contaminated it can affect the quality, potency and even safety of the product.

If a container of a sterile fluid has a one-time use and is not intended to be dispensed over an extended period of time, the problem of contaminants flowing into the container usually does not exist. In one known liquid handling container disclosed in U.S. Pat. No. 2,715,980 to Frick, the valve mechanism involves a valve body with a central port extending through the valve body and with branch ports extending from the central port to the outside surface of the valve body. An expansible sleeve, such as a sleeve of a rubber-like material, encloses the outside surface of the valve body preventing flow from the branch ports. When a fluid is to be dispensed, it flows through the central port and then through the branch ports causing the sleeve to expand and permitting the fluid to flow out around one end of the sleeve. During such flow, it is possible for contaminants to flow into the expanded end of the sleeve and then through the branch ports and central port, back into the container. An effective blockage of contaminant flow into the container is not available.

Another valve incorporating an elastic tube or sleeve is disclosed in U.S. Pat. No. 4,346,704 to Kulle. A parenteral solution is dispensed through a central tube or channel to branch ports which deliver the fluid to the inside surface of an elastic sleeve or tube. When the fluid is pressurized it displaces the elastic tube outwardly permitting flow from the branch ports outwardly from the end of the sleeve. The Kulle device is primarily intended for a one-time use, such as in dispensing an anesthetic. There is no particular problem with a return flow of contaminants into a container because of such one-time use. The Kulle device is intended to deliver anesthetics at high flow rates and low pressures so that accurate dispensing is possible.

SUMMARY OF THE INVENTION

Therefore, the primary object of the present invention is to provide a valve assembly for a container permitting the easy dispensing of the fluid while preventing any back flow of contaminants through the valve assembly into the container holding the remaining fluid.

In accordance with the present invention, a valve assembly includes an axially elongated valve body having an inlet end and an outlet end, spaced apart in the elongated direction. The valve body has an outside surface with an elastomeric sheath laterally enclosing and pressing inwardly against the outside surface. An inlet channel extends from the inlet end for a portion of the elongated direction. One or more ports or branch channels extend from the inlet channel radially outwardly relative to the elongated direction to the outside surface of the valve body. In the direction toward the outlet end of the valve body, one or more ports or branch channels extend generally radially inwardly from the outside surface to one end of an outlet channel extending in the elongated direction. The other end of the outlet channel is located at the outlet end of the valve body.

When the valve assembly is not in use, the elastomeric sheath bears tightly against the outside surface of the valve body blocking any flow through the outlet channel back into the container. If pressure is applied to the container forcing the fluid into the inlet channel, the fluid flows from the inlet channel into the ports outwardly toward the elastomeric sheath. The pressure of the fluid expands the elastomeric sheath radially outwardly permitting the flow between the outside surface of the valve body and the sheath to the ports connected to the outlet channel. The pressure applied to the fluid and the reaction of the elastomeric sheath forces the fluid out through the outlet channel. Once the fluid flows into the ports connected to the outlet channel, the elastomeric sheath returns to its original shape tightly enclosing the valve body and blocking off any flow from the ports connected to the outlet channel into the space between the valve body and the sheath. Accordingly, backflow into the container is prevented, assuring that contaminants do not enter the container and affect the quality, potency or sterility of the fluid.

In a preferred embodiment, the valve body is elongated in the direction of flow out of a container. At one end, the valve body has an inlet channel extending in the elongated direction and generally centered within the body. While a single outlet channel is effective in most uses, depending on the characteristics of the fluid being dispensed, a plurality of inlet channels could be used.

At the end of the inlet channel within the valve body, that is, spaced from the end receiving the fluid from the container, one or more ports are provided extending angularly relative to the elongated direction of the valve body radially outwardly to the outside surface of the body. While a single port could be used, it is preferable to provide angularly spaced ports for a uniform distribution of the fluid outwardly to the inside of the elastomeric sheath for expanding the sheath.

Spaced in the elongated direction of the valve body from the ports conveying the fluid to the inside of the elastomeric sheaths, additional ports are provided, usually of the same number, for flowing the fluid inwardly to an outlet channel extending in the elongated direction of the valve body and opening through the end of the body spaced outwardly from the container. In other words, the end of the outlet channel spaced from the ports forms the discharge end of the valve body.

For purposes of manufacturing the valve body and for efficiency in the flow of the fluid through the valve body, it is preferred to form the channels and ports with a generally rounded cross-section. These flow passageways may be circular in cross-section or oval.

Depending on the elastic character of the sheath and the pressure exerted by the fluid being dispensed as [t] *it* flows through the valve body, a rigid cylindrical tubular section can be placed around the elastomeric sheath for limiting the extent to which it is displaced outwardly from the outside surface of the valve body.

The valve assembly can be used with a variety of vessels or containers. Preferably, a compressible flexible container is used in the form of a plastic bag, an accordian pleated plastic container, a fireplace-bellows type container or the like. A bellows-like container is disclosed in U.S. Pat. No. 3,506,163 to Rauh, et al., and U.S. Pat. No. 4,526,296 issued to Berger, et al. The dispensing container is significant with regard to the present invention only to the extent that pressure can be applied to the fluid forcing it through the valve body for expanding the elastomeric sheath so that the fluid passes through the valve body to its outlet end.

The valve assembly can be used in dispensing materials of different consistencies including liquids, lotions, gels, powders, gases and the like. The dispensing container can be used to store and supply a great variety of products, such as foods, pharmaceutical preparations, cosmetics, industrial chemicals, photographic solutions, adhesives, paints and others.

A significant feature of the applicant's invention is the seal provided between the elastomeric sheath and the valve body or parts connected to the valve body. The seal is required to assure that the flow from the inlet channel to the ports directed between the outside surface of the valve body and the inside surface of the elastomeric sheath flows into the outlet ports in the outlet channel to effect dispensation. If the sheath is free at one or both ends, the fluid being dispensed could escape and contaminants could enter into the ports and channels and eventually into the container. The sheath can be sealed at its ends in a variety of ways, such as, with O-rings, adhesives, or by thermally or chemically bonding the sleeve to the valve body or to a part connected to it. With the opposite ends of the sheath sealed to the valve body, the flow of fluid directed between the outside surface of the body and the inside surface of the sheath can only flow out through the outlet ports and the outlet channel. Accordingly, there is no loss of fluid in the dispensing operation. Furthermore, the elastic character of the sheath assures that it will provide a block across the openings from the ports directed against the inside surface of the sheath so that the flow of contaminants cannot pass through the ports connected to the inlet channel and the inlet channel into the container.

A variety of materials can be used for the valve body and the elastomeric sheath with the materials being chosen for compatability with the fluid to be dispensed and any sterilization method used on the fluid. If thermal sterilization is used, the material selected must maintain its integrity throughout the temperature range of sterilization and for the time period required for sterilization. Sterilization may be achieved in other ways, such as by irradiation, ethylene oxide and the like.

Since the valve assembly of the present invention prevents any flow of contaminants into the dispensing container, there is no need to add preservatives which may be costly, affect the potency of the product, or have potentially harmful side effects.

In the development of the present invention, it has been noted that contaminants such as micro-organisms entering into a dispensing container will, within a brief period of time, develop into luxurious growths. Tests have been run on the invention and it has been determined that the valve assembly prevents any flow of such contamination into the container so that the fluid being dispensed can be stored for extended periods after it is first dispensed without any deleterious effects due to contaminants entering the container.

In a typical embodiment, the collapsible container is made up of polyolefin, the valve body is constructed of Teflon with an outside diameter of 0.5", the elastomeric sheath is made of a synthetic rubber with a Shore hardness of 50, an inside diameter of 0.375" and an outside diameter of 0.405". A rigid sheath is provided around the elastomeric sheath and has an inside diameter of 0.530". When the elastomeric sheath is placed on the valve body, it is stretched to assure that it maintains the required tight contact with the outside surface of the body for blocking the flow of contaminants when the valve assembly is not in use. It is also possible to make the elastomeric sheath of natural rubber and gutta percha.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
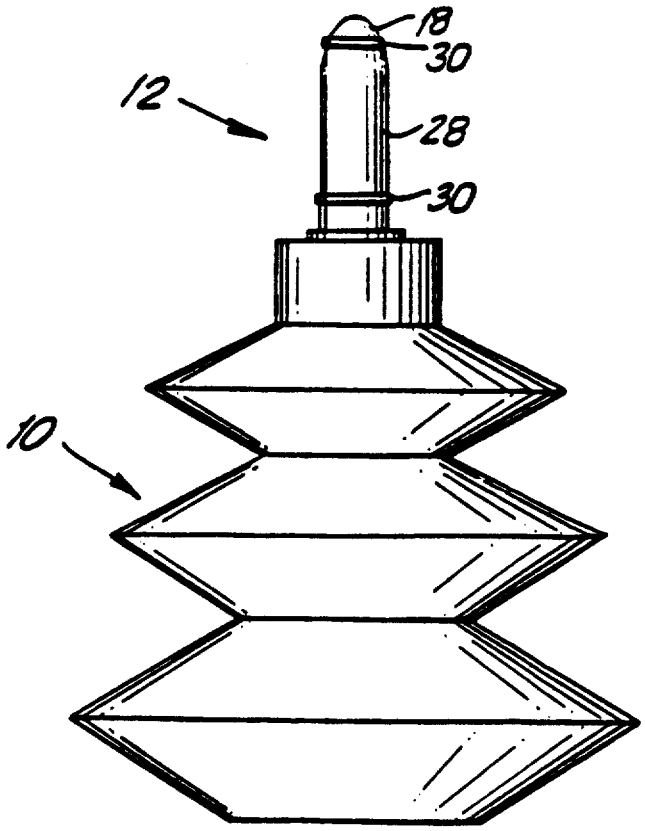
FIG. 1 is an elevational view of a valve assembly embodying the present invention mounted on a bellows-like flexible container.

In FIG. 1, a bellows-like flexible container 10 is shown with a valve assembly 12 mounted on one end of the container. The valve assembly 12 is constructed so that fluid within the container 10 is dispensed when the container is compressed.

Figure 2:
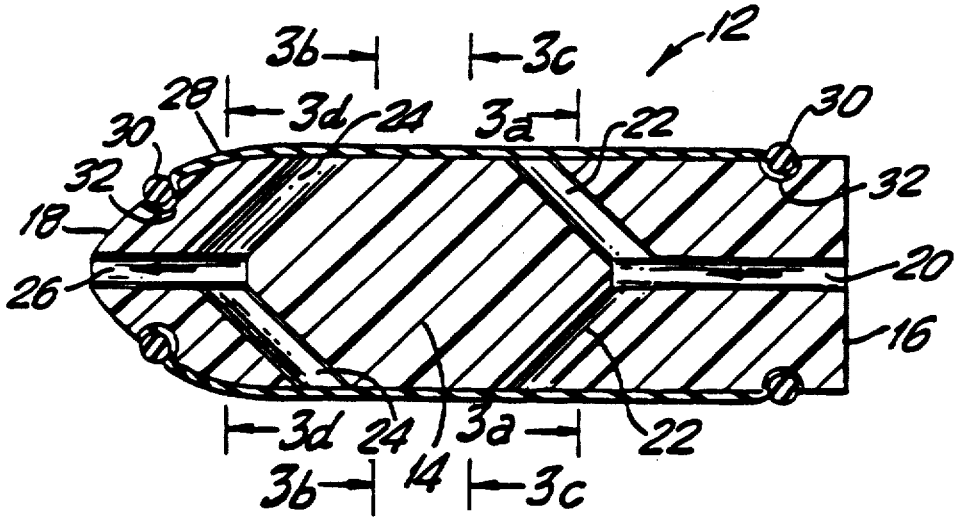
FIG. 2 is a longitudinal sectional view of one embodiment of the valve assembly shown in FIG. 1.

In FIG. 2, one embodiment of valve assembly 12 is shown including a valve body 14 elongated in the direction extending between an inlet end 16 and an outlet end 18. When the valve body 14 is placed on a dispensing container, the inlet end 16 is in communication with the inside of the container.

An inlet channel 20 extends from the inlet end 16 for a portion of the length of the valve body 14. As viewed in FIG. 2, the inlet channel extends for approximately one-third of the length. The opposite end of the inlet channel 20 from the inlet end 16 branches into four separate ports 22, spaced equi-angularly apart and extending to the outside surface 14a of the valve body 14. Spaced toward the outlet end 18 of the valve body are ports 24, which extend inwardly from the outside surface 14a spaced equi-angularly apart and terminate at the inner end of an outlet channel 26. The outlet channel 26 is axially aligned with the inlet channel 20, and the two channels are spaced apart in the elongated direction of the valve body.

Figure 3A:
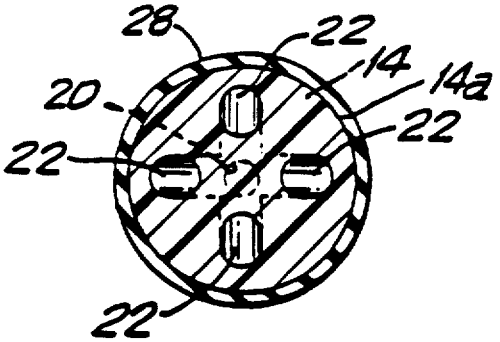
FIG. 3a is a cross-sectional view taken along the line 3a—3a in FIG. 2.
Figure 3B:
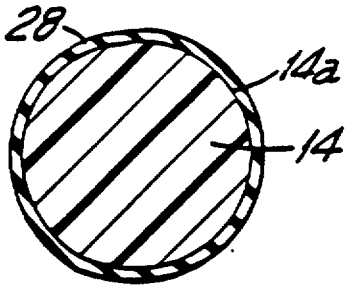
FIG. 3b is a cross-sectional view taken along the line 3b—3b in FIG. 2.
Figure 3C:
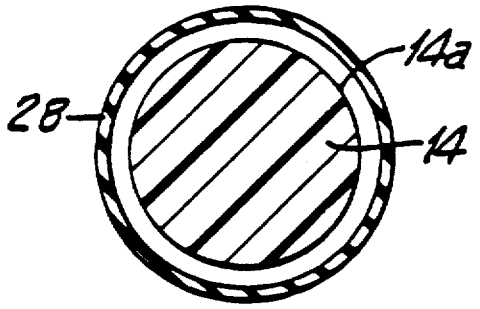
FIG. 3c is a cross-sectional view taken along the line 3c—3c in FIG. 2.
Figure 3D:
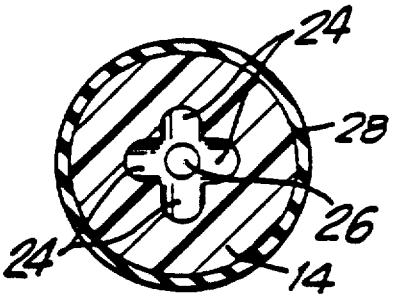
FIG. 3d is a cross-sectional view taken along the line 3d—3d in FIG. 2.

Encircling the outside surface 14a and in normally tight fitting contact with the outside surface is an elastomeric sheath 28. As shown in FIG. 2, the elastomeric sheath extends from adjacent the inlet end 16 to adjacent the outlet end 18 of the valve body. At each of its ends, spaced apart in the elongated direction of the valve body, the sheath 28 is sealed to the outside surface 14a of the valve body. As shown in FIGS. 3a, 3b, and 3d, the sheath 28 is stretched when it is placed on the valve body so that it fits tightly about the valve body forming a closure of the openings of the ports 22, 24 extending through the outside surface of the valve body 14.

As viewed in FIG. 2, the sheath is secured to the outside surface of the valve body 14 by O-ring-like members 30 seated into recesses 32 in the outside surface of the valve body. The particular means used for sealing off the opposite ends of the sheath may vary depending on the type of materials used and the characteristics of the fluid being dispensed. In addition to O-ring members 30, the sheath can be sealed by thermal or chemical bonding operations or by the use of adhesives.

If the container 10 in FIG. 1 is squeezed or compressed in its long direction, the contents will flow out through the valve assembly 12, passing first through the inlet channel 20 into the valve body 14. As the fluid flows out of the inlet channel 20, it passes into one of the four ports 22 and flows generally radially outwardly to the outside surface 14a of the valve body. The pressure of the fluid causes the elastomeric sheath 28 to expand outwardly so that the fluid flows between the outside surface 14a of the valve body and the inside surface of the elastomeric sheath until it reaches one of the other set of ports 24 for flow radially inwardly. The fluid from the ports 24 flows into the inner end of the outlet channel 26, and then passes through the outlet channel for discharge from the valve assembly.

When the fluid is not flowing through the valve assembly 12, the elastomeric sheath 28 forms a block or closure for each of the ports 22, 24 at the outside surface of the valve body 14. As a result, contaminants cannot flow through the valve assembly back into the container. When the fluid causes the sheath 28 to expand the flow of the fluid will block any contaminants from passing into the container. Once the fluid reaches the ports 24, the elastomeric sheath will contract and block the ports 24 at the outside surface 14a of the valve body 14, so that backflow into the container through the outlet channel 26 assembly is prevented.

Figure 4:
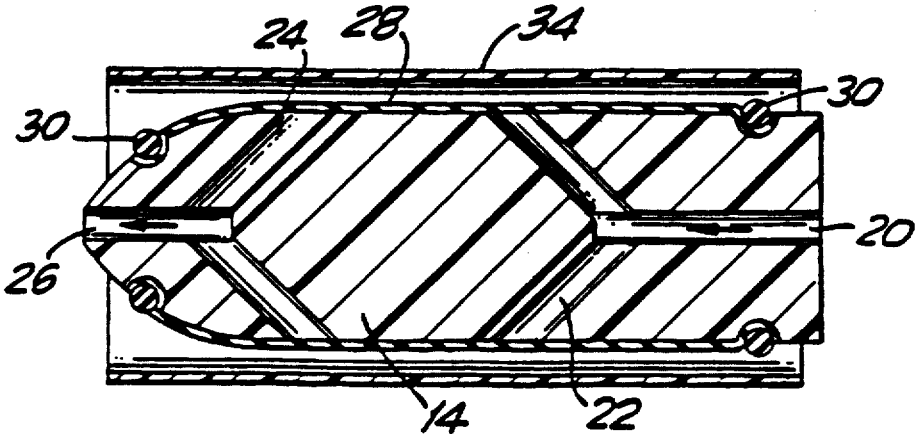
FIG. 4 is a view similar to FIG. 2 with a rigid tubular section located around the valve assembly.

In FIG. 4, the structure of the valve assembly is the same as in FIG. 2, however, an elongated rigid tubular section 34 is located around and slightly outwardly from the elastomeric sheath 28. The tubular section 34 provides a restraint for the radially outwardly movement of the sheath 28. If there is a tendency for the sheath to expand in an uncontrolled manner, the tubular section 34 limits its outward movement. The tubular section 34 is needed only under particular circumstances and is not a required element of the valve assembly.

Figure 5:
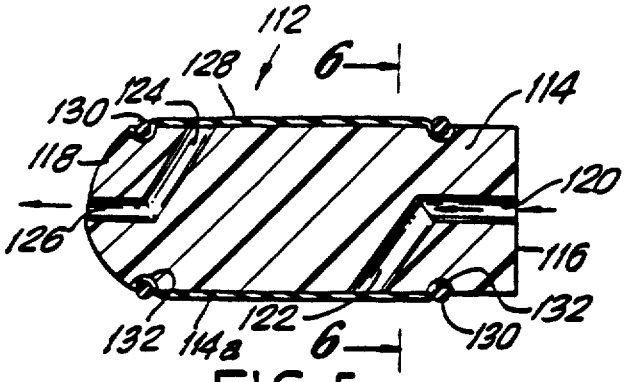
FIG. 5 is a longitudinal sectional view of another embodiment of the invention.
Figure 6:
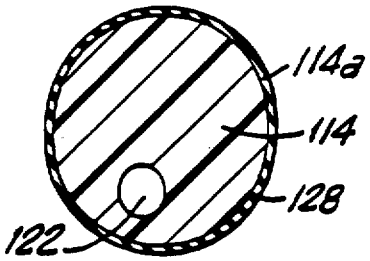
FIG. 6 is a cross-sectional view taken along the line [VI—VI] *6—6* in FIG. 5.

In FIGS. 5 and 6, another embodiment is shown of the invention. Valve assembly 112 has a valve body 114, with a inlet end 116, and an outlet end 118. The valve body 114 is elongated in the inlet-outlet direction.

The valve body has an inlet channel 120 extending from the inlet end 116 for about a quarter of the length between the ends of the valve body. As distinguished from the embodiment illustrated in FIGS. 2, 3 and 4, a single port 122 extends from the end of the inlet channel 120, spaced inwardly from the inlet end 116, to the outside surface 114a of the valve body. On the diametrically opposite side of the valve body, another port 124 extends radially inwardly from the outside surface to the inner end of an outlet channel 126. The openings to the ports 122, 124 in the outside surface of the valve body are spaced apart in the elongated direction. This particular arrangement prevents channeling of the flow between the elastomeric sheath 128 and the outside surface 114a of the valve body 114. Accordingly, the flow exiting from the port 122 travels around the valve body between the outside surface 114a and the inside surface of the sheath 128 to the inlet into the port 124.

As can be seen in FIG. 5, the opposite ends of the elastomeric sheath 128 are sealed to the outside surface 114a of the valve body 114 by O-rings 130.

In FIG. 6, the port 122 is shown intermediate its inlet and outlet ends. In addition, the elastomeric sheath 128 fits tightly against the outside surface 114a of the valve body 114 providing closures for the ports 122, 124. The valve assembly 112 operates in the same general manner as the valve assembly 12 with the elastomeric sheath 128 being expanded outwardly only when fluid is forced from a container into the inlet channel 120 for flow through and about the valve body to the outlet channel 126.

Figure 7:
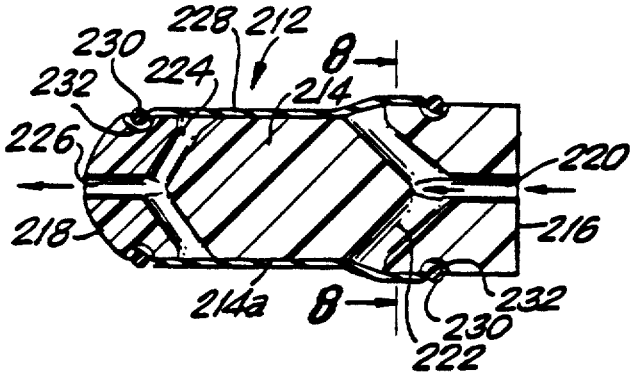
FIG. 7 is a view similar to FIG. 5 of still another embodiment of the invention.
Figure 8:
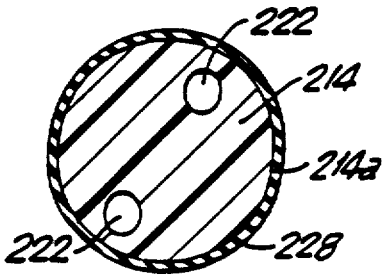
FIG. 8 is a cross-sectional view taken along the line [VIII—VIII] *8—8* in FIG. 7.

In FIGS. 7 and 8, yet another embodiment of the valve assembly is shown. As distinguished from the previous embodiments, this embodiment has a valve assembly 212, including an elongated valve body 214. The valve body extends in its elongated direction between an inlet end 216 and an outlet end 218. As distinguished from the embodiment in FIGS. 5 and 6, the valve assembly 212 has two ports 222, branched outwardly from the downstream end of an inlet channel 220. The ports 222 are located 180° apart, each extending to the outside surface 214a of the valve body. Spaced along the outside surface 214a from the ports 222 is another pair of ports 224 extending inwardly from the outside surface and terminating at the inner or upstream end of an outlet channel 226. While in FIG. 7, the ports 222 and 224 appear to be in the same plane, the ports 224 are actually rotated 90° with regard to the ports 222 for the same effect as in the embodiment of FIGS. 5 and 6, that is, to prevent channeling of the fluid flowing through the valve assembly.

An elastomeric sheath 228 laterally encloses the outside surface of the valve body from a location adjacent the inlet end 216 to a location adjacent the outlet end 218 so that the sheath covers the openings of the ports 222, 224 in the outside surface of the valve body. As in the previous embodiment, the ends of the elastomeric sheath 228 are sealed to the outside surface of the valve body 214 by O-rings 230. The O-rings seats within recesses 232. As mentioned above, it is also possible to use other sealing means for securing the opposite ends of the sheath so that the fluid being dispensed through the valve assembly does not by-pass around the ports 224 extending to the outlet channel 226.

As can be seen in FIG. 8, the ports are located diametrically opposite one another. The other ports 224 would be spaced from the illustrated ports by 90°.

Figure 9A:
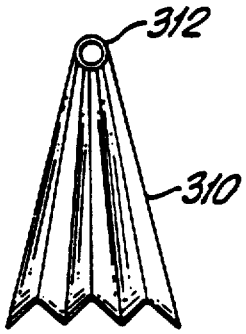
FIG. 9a is an elevational view of the valve assembly of the present invention mounted on a fireplace bellows-type flexible container.
Figure 9B:
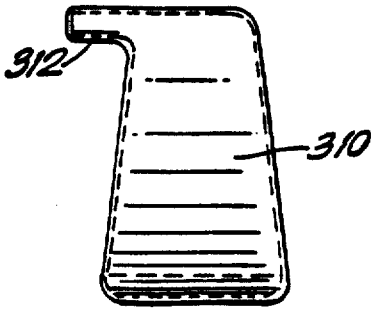
FIG. 9b is an elevational view of the arrangement shown in FIG. 9a rotated through 90°.

In FIGS. 9a and 9b, another container 310 is illustrated with a valve assembly 312 projecting from the top of the container transversely of its height. The walls of the container are in the form of a fireplace bellows, note FIG. 9a, so that by pressing the sides inwardly toward one another, the fluid is dispensed through the valve assembly 312.

While the containers 10 and 310 are both flexible containers, it would be possible to provide a container arrangement not of a flexible construction, but of a collapsible construction where a portion of the container is telescopically movable into another portion for dispensing the fluid. A person skilled in the art would appreciate that a variety of container constructions could be used with the valve assembly of the present invention.

While specific embodiments of the invention have been shown and described in detail to illustrate the application of the inventive principles, it will be understood that the invention may be embodied otherwise without departing from such principles.

I claim:

1. A fluid dispensing assembly including a container and a dispensing valve for dispensing fluid from the container and preventing any backflow of contaminants into the container during and following the dispensing of the fluid, said container having an outlet and being capable of discharging fluid from the container when a compressing force is applied to the fluid within the container, said dispensing valve including an elongated valve body having an inlet end and an outlet end spaced apart in the elongated direction and an outside surface extending in the elongated direction between the inlet end and the outlet end, said inlet end connected to the container outlet for receiving fluid flow therefrom, an inlet channel located within said valve body and having a first end at said inlet end of said valve body and a second end spaced from the first end toward the outlet end of said valve body with said inlet channel arranged for receiving fluid from the container, at least one *first* port in said valve body extending from the second end of said inlet channel through said valve body to the outside surface so that said first port opens through said outside surface, an outlet channel located within said valve body and having a first end located adjacent the outlet end of said valve body and a second end spaced from the first end in the direction toward the inlet end of said valve body, at least one second [portion] *port* in said valve body extending from said second end of said outlet channel to the outside surface of said valve body so that said second port opens through said outside surface and is spaced from said first port where said first port opens through said outside surface, an elastomeric sheath laterally enclosing said outside surface of said valve body and extending over said first and second ports and forming closures for said first and second ports, said elastomeric sheath prior to placement around said valve body has an inside diameter smaller than the diameter of the outside surface of said valve body so that the sheath is stretched and fits tightly around said valve body, said elastic sheath being elastically deformable between a first position forming the closure of the said first and second ports at the outside surface of said valve body and a second position spaced outwardly from said first and second ports so that flow through said inlet channel into said first port enters between said outside surface of said valve body and said sheath and flows therebetween to said second port and then through said second port to said outlet channel for discharge from the first end of said outlet channel, and said elastomeric sheath being in sealed engagement with said valve body in the direction of flow through said valve body [upstream] *downstream* from said second port and [downstream] *upstream* from said first port in relation to the direction of flow through said valve body so that flow entering between the outside surface of said valve body and said sheath passes only through said first and second ports.

2. A fluid dispensing assembly, as set forth in claim 1, wherein said valve body having a central axis extending in the elongated direction and a plurality of said first ports and said second ports with said first and second ports being angularly spaced apart around the central axis.

3. A fluid dispensing assembly, as set forth in claim 2, wherein there is an equal number of said first ports and said second ports and said first and second ports are equi-angularly spaced apart around the central axis.

4. A fluid dispensing assembly, as set forth in claim 1, wherein said inlet channel, outlet channel, first and second ports are each defined by a transversely extending curvilinear surface.

5. A fluid dispensing assembly, as set forth in claim 4, wherein said inlet channel, outlet channel, first and second ports are circular in transverse cross-section.

6. A fluid dispensing assembly, as set forth in claim 1, wherein said elastomeric sheath is formed of synthetic rubber.

7. A fluid dispensing assembly, as set forth in claim 1, wherein said elastomeric sheath is formed of natural rubber.

8. A fluid dispensing assembly, as set forth in claim 1, wherein said elastomeric sheath is formed of gutta percha.

9. A fluid dispensing assembly, as set forth in claim 1, wherein said elastomeric sheath is formed of a flexible plastics material.

10. A fluid dispensing assembly, as set forth in claim 1, wherein an O-ring is located at each of the opposite ends of said elastomeric sheath spaced apart in the elongated direction and secures said elastomeric sheath in sealed engagement with the outside surface of said valve body.

11. A fluid dispensing assembly, as forth in claim 1, wherein the opposite ends of said elastomeric sheath spaced apart in the elongated direction are thermally sealed to the outside surface of said valve body.

12. A fluid dispensing assembly, as set forth in claim 1, wherein the opposite ends of said elastomeric sheath spaced apart in the elongated direction are chemically bonded to the outside surface of said valve body.

13. A fluid dispensing assembly, as set forth in claim 1, wherein the opposite ends of said elastomeric sheath spaced apart in the elongated direction are adhesively secured to the outside surface of said valve body.

14. A fluid dispensing assembly, as set forth in claim 1, wherein one said first port extends from said inlet channel to the outside surface of said valve body and one said second port extends from the outside surface of said valve body to said outlet channel and said first port and second port being located on diametrically opposite sides of said valve body.

15. A fluid dispensing assembly, as set forth in claim 1, wherein two said first ports extend diametrically oppositely outwardly from said inlet channel and two said second ports extend diametrically oppositely outwardly from said outlet channel and said first ports being spaced 90° apart with respect to said second ports.

16. A fluid dispensing assembly, as set forth in claim 1, wherein a rigid tubular section laterally encloses and is spaced radially outwardly from said elastomeric sheath in the first position thereof and limits the radially outward displacement of said elastomeric sheath in the second position thereof.

17. A fluid dispensing assembly, as set forth in claim 1, wherein said container is flexible.

18. A fluid dispensing assembly, as set forth in claim 17, wherein said container is a bellows-like [manner] member.

19. A fluid dispensing assembly, as set forth in claim 17, wherein said container is a flexible fireplace bellows-type container.

20. A fluid dispensing assembly, as set forth in claim 1, wherein said [contained] *container* is collapsible for supplying fluid to said valve body when said container is collapsed.

21. A fluid dispensing assembly, as set forth in claim 1, wherein said first port extends to said outside surface at a location closer to the inlet end of said valve body than said second port.

22. A fluid dispensing assembly, as set forth in claim 1, wherein said valve body is formed of a plastics material.

23. A fluid dispensing assembly, as set forth in claim 22, wherein said valve body is formed of Teflon.

24. A fluid dispensing assembly, as set forth in claim 1, wherein said inlet channel and outlet channel are in alignment in the elongated direction of said valve body with the second end of said inlet channel and the second end of said outlet channel being spaced apart in the elongated direction.

* * * * *